May 8, 1945. A. DE L. SINDEN 2,375,699
CONVEYER
Original Filed Jan. 10, 1940

INVENTOR
ALFRED DE LOS SINDEN
BY J. Stanley Churchill
ATTORNEY

Patented May 8, 1945

2,375,699

UNITED STATES PATENT OFFICE 2,375,699

CONVEYER

Alfred De Los Sinden, Aurora, Ill., assignor to Redler Conveyor Company, Quincy, Mass., a corporation of Massachusetts Original application January 10, 1940, Serial No. 313,158. Divided and this application January 19, 1942, Serial No. 427,311

1 Claim. (Cl. 198—65)

This invention relates to a conveyer and more particularly to a conveyer for elevating free flowing materials.

The invention has for an object to provide a novel and improved construction of conveyer of the character specified having an endless conveying element provided with a plurality of flight members pivoted thereon and a head sprocket over which the conveying element is arranged to pass and having means disposed beneath the head sprocket for receiving the material spilled from said flights as they pass over the head sprocket and for controlling its discharge from the machine.

With this general object in view and such others as may hereinafter appear, the invention consists in the conveyer and in the various structures, arrangements and combinations of parts hereinafter described and particularly defined in the claims at the end of this specification.

Figure 1:
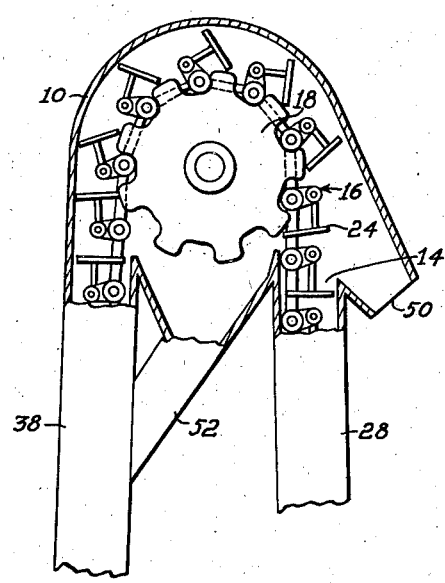
Figure 2:
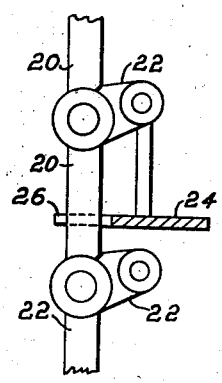

In the drawing Fig. 1 illustrates the present conveyer in side elevation, partly in section, and Fig. 2 is a detail illustrating the construction of pivoted conveyer flight.

In general, the present invention contemplates an improved construction of a conveyer of the character specified and of the type particularly adapted for use in elevating material of a substantially free flowing nature through an upright casing or conduit by an endless conveying element to discharge the same through a discharge outlet provided in the upright casing. The endless conveying element, which may preferably comprise a plurality of connected links each having a transverse flight member pivotally connected thereto, is arranged to pass over a head sprocket after passing the discharge outlet and in so doing the flight members are tilted in a direction such as to spill any material remaining thereon inwardly under the head sprocket. In accordance with the present invention, provision is made for receiving such material spilled from the tilted flights and for controlling the discharge thereof.

Referring now to the drawing, as shown in Figs. 1 and 2, the numeral 10 represents a conveyer casing or conduit provided with a discharge outlet 14. A conveying element, indicated generally at 16, is arranged to be drawn through the conduit 10 over a head sprocket 18 to convey material to the outlet 14. The conveying element 16 preferably comprises a plurality of connected links 20, each being provided with an extended portion 22 to which a flight member 24 is pivotally connected to suspend it in a position transversely of the casing 10. Each flight member is of a size such as to nearly fill the cross-sectional area of the conduit, and as shown in Fig. 2, each flight may be provided with a slotted portion 26 to provide clearance for the links 20.

In operation, the material supplied through the conveyer inlet 12 is carried up through the upright leg 28 by the flight members 24 in cooperation with the side walls of the casing, and when the outlet 14 is reached, the bulk of the material carried by the flights will flow through the discharge opening 30 until the material on the transverse flights reaches its normal angle of repose. Thus, each flight member 24 after it passes the outlet 14 and while it still remains suspended in a transverse position, will carry a small amount of material remaining thereon. When the flights start to pass over the head sprocket 18 the edges of the flights engage the sprocket and the flights are tilted, as illustrated in Fig. 1, to spill the material remaining thereon in a direction such as to fall under the head sprocket.

As herein shown a second discharge chute 52 of generally funnel shape is disposed immediately beneath the head sprocket 18 and in communication with the return leg 38 is arranged to receive the material remaining on the flights as they spill the material therefrom in passing over the head sprocket. The material thus received is returned to the conveyer to join the material being delivered to the conveyer and to be again elevated through the leg 28 to be discharged as above described.

This application is a division of my application Serial No. 313,158 filed Jan. 10, 1940.

While the preferred embodiments of the invention have been herein illustrated and described, it will be understood that the invention may be embodied in other forms within the scope of the following claims.

Having thus described the invention, what is claimed is:

In a conveyer of the character described, a conduit having two separate spaced and substantially parallel legs, one constituting an elevating leg and the second a return leg, an endless conveying element transversable through the conduit and having a plurality of substantially solid transverse flight members pivoted thereon, a head sprocket over which the conveying element is arranged to pass, said flight members cooperating with the conduit to carry material up through said elevating leg and being arranged to tilt as they pass over said head sprocket, a discharge chute leading from the elevating leg immediately below the head sprocket and through which the bulk of the material is discharged, and a second discharge chute connected to the adjacent inner walls of said spaced legs and disposed between the same below said head sprocket and in communication with said return leg for receiving the remaining material as it is spilled during passage of the conveying element over the head sprocket and for returning such material to the return leg of the conduit.

ALFRED DE LOS SINDEN.